(12) United States Patent
Doi

(10) Patent No.: US 8,733,207 B2
(45) Date of Patent: May 27, 2014

(54) METHOD OF DRIVING JOINT DEVICE

(75) Inventor: Masahiro Doi, Chofu (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 110 days.

(21) Appl. No.: 13/577,416

(22) PCT Filed: Mar. 23, 2011

(86) PCT No.: PCT/JP2011/001704
§ 371 (c)(1),
(2), (4) Date: Aug. 6, 2012

(87) PCT Pub. No.: WO2012/127532
PCT Pub. Date: Sep. 27, 2012

(65) Prior Publication Data
US 2013/0074636 A1    Mar. 28, 2013

(51) Int. Cl.
*F16H 35/00*     (2006.01)
*B25J 17/00*     (2006.01)

(52) U.S. Cl.
USPC ............................. 74/640; 74/490.03

(58) Field of Classification Search
USPC ................................. 74/640, 490.03
See application file for complete search history.

(56) References Cited

U.S. PATENT DOCUMENTS

| | | | | |
|---|---|---|---|---|
| 5,222,409 A | * | 6/1993 | Dalakian | 74/479.01 |
| 7,891,272 B2 | * | 2/2011 | Schonlau | 74/640 |
| 7,966,907 B2 | * | 6/2011 | Koyama | 74/640 |
| 8,117,945 B2 | * | 2/2012 | Nakamura | 74/640 |
| 8,229,324 B2 | * | 7/2012 | Takigawa et al. | 399/167 |
| 8,616,086 B2 | * | 12/2013 | Hirai et al. | 74/640 |

FOREIGN PATENT DOCUMENTS

| | | |
|---|---|---|
| JP | 61-147407 U | 9/1986 |
| JP | 01-100611 A | 4/1989 |
| JP | 01-209508 A | 8/1989 |
| JP | 02-048710 A | 2/1990 |
| JP | 04-257001 A | 9/1992 |
| JP | 06-282305 A | 10/1994 |
| JP | 06-309008 A | 11/1994 |
| JP | 07-333084 A | 12/1995 |
| JP | 08-155868 A | 6/1996 |

(Continued)

OTHER PUBLICATIONS

Ichiro Awaya: "Control of Vibration Systems with Friction", Journal of Robotics Society of Japan, vol. 13, No. 8, pp. 1078-1083, Nov. 1995.

(Continued)

*Primary Examiner* — Ha D Ho
(74) *Attorney, Agent, or Firm* — Kenyon & Kenyon LLP (57) ABSTRACT

Provided is a method of driving a joint device suitably used for a robot joint with improved back drivability. A first motor and a second motor are fixedly connected to a first link. An output shaft of the first motor is coupled to an internal gear of a differential speed reducer. An output shaft of the second motor is coupled to an external gear of the differential speed reducer. A second link is coupled to the internal gear of the differential speed reducer. When the first link and the second link are relatively stopped to keep a joint angle fixed, both of the first motor and the second motor are rotated with a rotational speed larger than zero, and the rotational speed of the first motor and that of the second motor are differentiated to stop the second link.

3 Claims, 11 Drawing Sheets

(56) References Cited

FOREIGN PATENT DOCUMENTS

| | | |
|---|---|---|
| JP | 08-286759 A | 11/1996 |
| JP | 08-308178 A | 11/1996 |
| JP | 09-231701 A | 9/1997 |
| JP | 10-011121 A | 1/1998 |
| JP | 11-049013 A | 2/1999 |
| JP | 11-123690 A | 5/1999 |
| JP | 11-143548 A | 5/1999 |
| JP | 2002-046632 A | 2/2002 |
| JP | 2003-256004 A | 9/2003 |
| JP | 2004-195576 A | 7/2004 |
| JP | 2005-098495 A | 4/2005 |
| JP | 2005-349555 A | 12/2005 |
| JP | 2006-146572 A | 6/2006 |
| JP | 2007-001444 A | 1/2007 |
| JP | 2009-291874 A | 12/2009 |

OTHER PUBLICATIONS

Kiyoshi Nagai et al.: "Force Sensorless Compliance Control Using a Limitation Algorithm and Dither for Manipulators with Harmonic Drive Gears", Journal of Robotics Society of Japan, vol. 22, No. 3, pp. 353-360, Apr. 2004.

International Search Report mailed Jun. 7, 2011 and Written Opinion of PCT/JP2011/001704.

* cited by examiner

METHOD OF DRIVING JOINT DEVICE

This is a 371 national phase application of PCT/JP2011/001704 filed 23 Mar. 2011, the contents of which are incorporated herein by reference.

TECHNICAL FIELD

The present invention relates to a robot joint device and a method of controlling drive of a joint unit of a robot. More specifically, the present invention relates to a robot joint device having flexibility (back drivability) with respect to external force, and a method of controlling drive of a robot joint unit having flexibility (back drivability) with respect to external force.

BACKGROUND ART

In recent years, development of a service robot used in circumstances in which the robot exists in proximity to a person has been promoted. For example, a bipedal walking robot is known, which does some performance at entertainment venues or walks among people. Furthermore, research of care support robots has been advancing to put them into practical use.

When a robot and a person exist closely with each other, it is important to take safety measures assuming a case in which the person contacts the robot.

For example, when a robot and a person contact with each other, it is required to mitigate the force acted at the time of contact.

In order to achieve this, it is required to give so-called softness to joints of a robot.

Service robots are required to have light weight, high torque capability, and perform operation control with high accuracy. From these points of views, the combination of a servo motor and a differential speed reducer has been adopted in the joint unit of almost all the service robots. The differential speed reducer has compactness, light weight, high accuracy, and high reduction ratios, and is the element indispensable for driving joints of a service robot. While such a differential speed reducer is able to achieve driving with high accuracy with no backlash in a compact space, its back drivability is extremely low. In particular, in a state in which the joints are stopped, a large static friction acts on mesh of gears in the differential speed reducer. Accordingly, unless extremely large torque is applied from an output side, it is impossible to rotate the joint from the output side against the static friction in the differential speed reducer.

There is a method of dithering.

It means oscillating the motor by a high-frequency wave with small amplitude in a joint stationary state, thereby artificially producing a state in which the static friction does not act.

Figure 11:
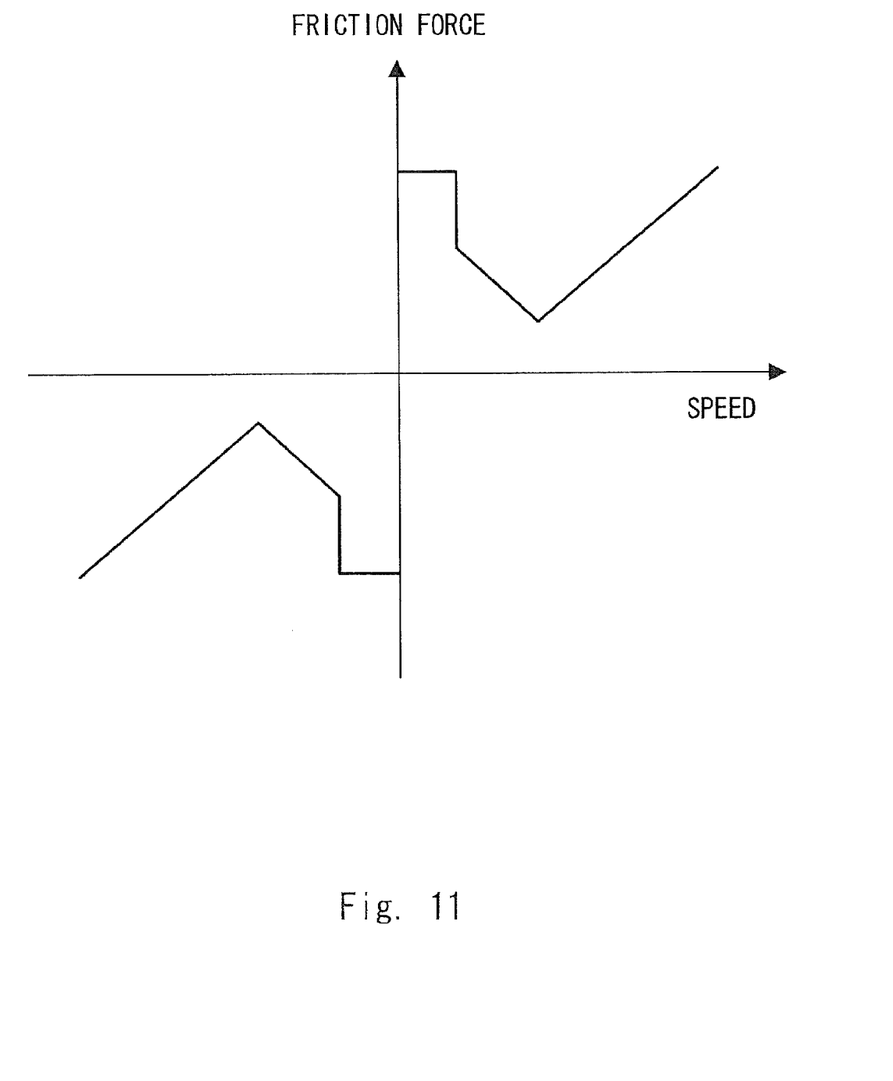
FIG. 11 is a diagram showing an example of a friction model.

A friction model is disclosed in a non-patent literature 1, for example. FIG. 11 shows this friction model. Although there are many other friction models, the basic pattern is substantially the same.

As will be understood from this friction model, large friction (static friction) acts in a low-speed region. Then, after the friction is reduced once to a certain speed, the friction force (viscous friction) increases along an increase in the speed. This is the typical friction model. In a non-patent literature 2, it is examined how much the friction at the time of operation start is reduced by dithering. In the non-patent literature 2, it is demonstrated that the external force required at the time of operation start can be made smaller when dithering is performed, and it is reported that back drivability may be improved by using dithering. A method of reducing the friction by such dithering is applied in the patent literature 1, for example.

CITATION LIST

Patent Literature

PTL 1: Japanese Unexamined Patent Application Publication No. 11-49013

Non Patent Literature

NPTL 1: Journal of the Robotics Society of Japan, Vol. 13, No 8, pp. 1078-1083
NPTL 2: Journal of the Robotics Society of Japan, Vol. 22, No 3, pp. 353-360

SUMMARY OF INVENTION

Technical Problem

However, a problem raised when dithering is performed is that hands or fingers subtly oscillate. Further, a problem caused when the motor is oscillatory moved is that the life of mechanism components such as a speed reducer is dramatically decreased. Furthermore, a problem raised when the motor is oscillatory moved is that noise is occurred due to the oscillation.

These are significant disadvantages in a robot joint, and are not negligible particularly when the use as a service robot is considered.

The present invention aims to provide a joint device which is suitable for a robot joint and has improved back drivability, and a method of driving the same.

Solution to Problem

A method of driving a joint device according to the present invention is a method of driving a joint device including a drive unit and a differential speed reducer provided between a first link and a second link, the joint device controlling drive of the first link and the second link as joints, in which the differential speed reducer includes an internal gear, an intermediate gear, and an external gear, and the drive unit includes a first motor and a second motor, the method including:

fixedly connecting the first motor and the second motor to the first link;

coupling an output shaft of the first motor to one of the internal gear, the intermediate gear, and the external gear of the differential speed reducer;

coupling an output shaft of the second motor to one of the internal gear, the intermediate gear, and the external gear of the differential speed reducer which is different from the gear coupled to the output shaft of the first motor; and coupling to the second link one of gears of the internal gear, the intermediate gear, and the external gear of the differential speed reducer which is different from the gear coupled to the output shaft of the first motor and the gear coupled to the output shaft of the second motor; and rotating both of the first motor and the second motor at a rotational speed larger than zero, and stopping the second link by differentiating the rotational speed of the first motor and that of the second motor when the first link and the second link are relatively stopped to keep a joint angle fixed.

According to the present invention, the differential speed reducer is preferably a harmonic drive gear mechanism or a planetary gear mechanism.

According to the present invention, it is preferable to specify a relation between a friction force and a relative speed difference among the internal gear, the intermediate gear, and the external gear as a friction model in the differential speed reducer, and determine a rotational speed in each of the first motor and the second motor so as to approach a speed difference to minimize the friction with a rotational speed ratio which can achieve joint stop.

A joint device according to the present invention is a joint device including a differential speed reducer provided between a first link and a second link and driving joints of the first link and the second link, the joint device including:

a first motor fixedly coupled to the first link, the first motor having an output shaft coupled to one of an internal gear, an intermediate gear, and an external gear of the differential speed reducer; and a second motor fixedly coupled to the first link, the second motor having an output shaft coupled to any one of gears different from the gear coupled to the output shaft of the first motor among the internal gear, the intermediate gear, and the external gear of the differential speed reducer, in which one of gears different from the gear coupled to the output shaft of the first motor and the gear coupled to the output shaft of the second motor among the internal gear, the intermediate gear, and the external gear of the differential speed reducer is coupled to the second link.

Advantageous Effects of Invention

According to the present invention, such a state can be achieved in which gears in the differential speed reducer relatively move while the joint stops the motion. In short, such a state can be achieved in which static friction does not act in the differential speed reducer even when the joint stops motion. Accordingly, the friction in the differential speed reducer becomes small, whereby high back drivability can be secured.

DESCRIPTION OF EMBODIMENTS

A robot joint device according to the present invention will now be described. A structure and an operation of a differential speed reducer used for the robot joint device will be described before describing a structure of the present invention.

Although the structure itself of the differential speed reducer is already known, it will be briefly described since it is a basis to understand the present invention.

A harmonic drive gear known as a harmonic drive (registered trademark) will be described as an example of the differential speed reducer.

Figure 1:
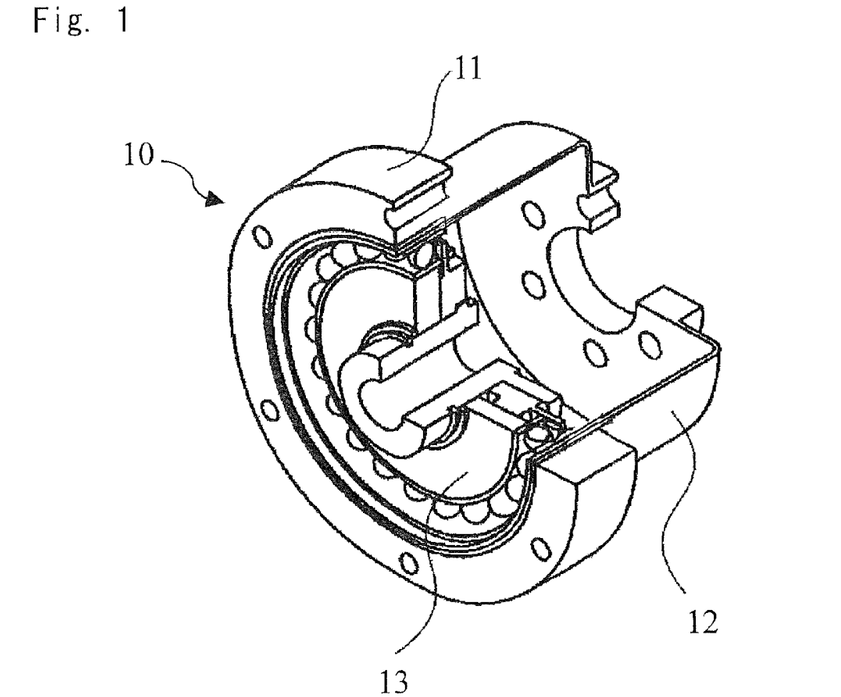
FIG. 1 is a diagram showing a structure of a harmonic drive gear.
Figure 2A:
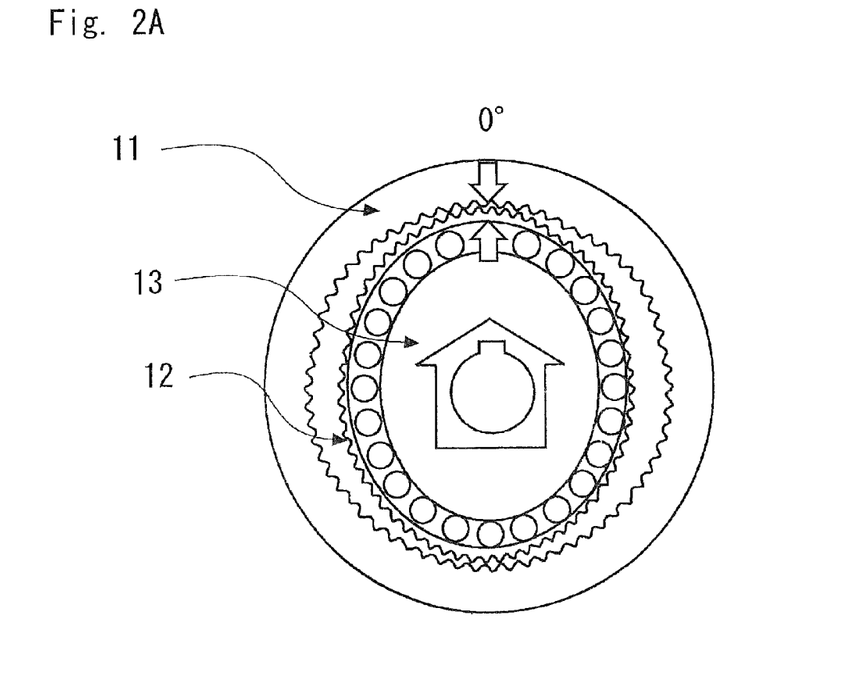
FIG. 2A is a diagram describing an operation of the harmonic drive gear.
Figure 2B:
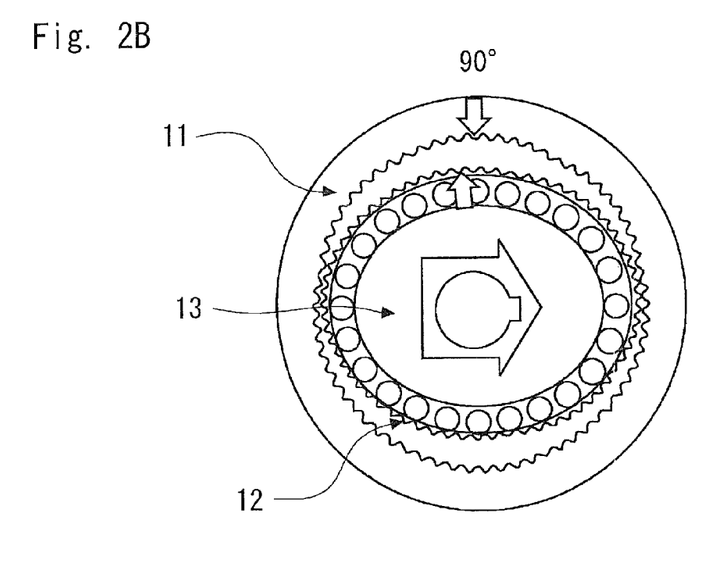
FIG. 2B is a diagram describing an operation of the harmonic drive gear.
Figure 2C:
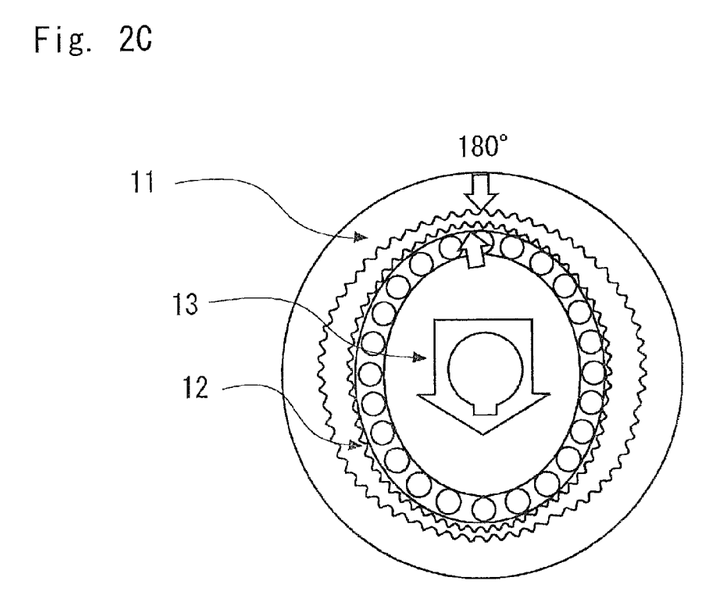
FIG. 2C is a diagram describing an operation of the harmonic drive gear.
Figure 2D:
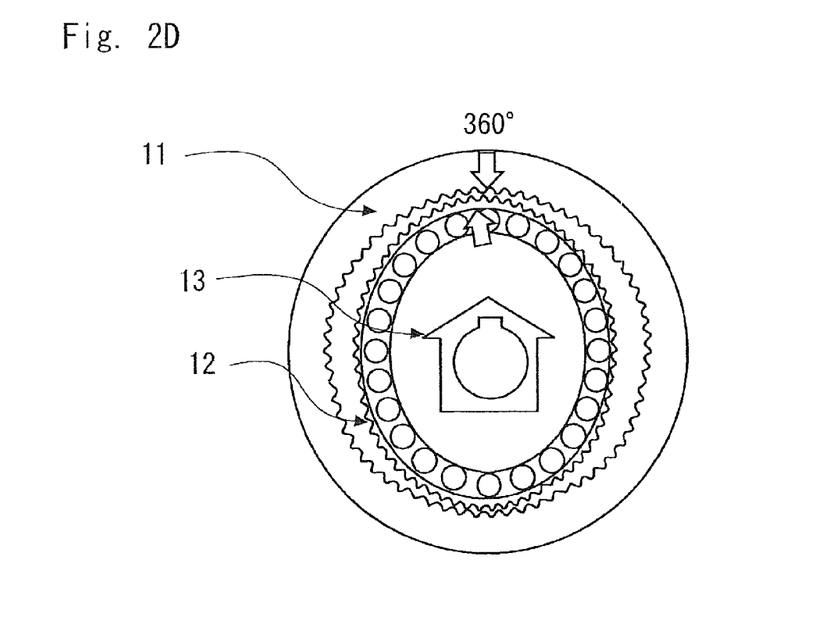
FIG. 2D is a diagram describing an operation of the harmonic drive gear.

FIG. 1 is a diagram showing a structure of the harmonic drive gear. FIGS. 2A to 2D are diagrams describing an operation of the harmonic drive gear.

A harmonic drive gear 10 is a mechanism that reduces the speed of the rotation of an input shaft with an extremely large reduction ratio (extremely large reduction ratio of several tens or several hundreds) to transmit it to an output shaft. The harmonic drive gear 10 includes a circular spline 11 as an external gear, a flex spline 12 as an intermediate gear, and a wave generator 13 as an internal gear.

Inner teeth are formed in an inner side of a housing case provided to contain the harmonic drive gear 10, thereby forming the circular spline 11 as the external gear. On the other hand, a plurality of pressing balls are arranged at equal intervals along the outer periphery of an elliptic cam, thereby forming the wave generator (internal gear) 13. The flex spline (intermediate gear) 12 is formed of an elastic material, and the wave generator 13 is arranged in the inner side of the flex spline 12 along the inner peripheral surface. Outer teeth are formed in an outer periphery of the flex spline (intermediate gear) 12, and the outer teeth are formed to mesh with the circular spline 11 which is the external gear. More specifically, when the elliptic cam presses the balls in the outer peripheral direction in the outer surface, the flex spline (internal gear) 12 is elastically deformed into an elliptical shape. Then two parts corresponding to the long shaft of the ellipse are pressed to the outermost peripheral side to mesh with the circular spline 12. Note that the number of teeth of the circular spline 11 is larger than the number of teeth of the flex spline 12 by two.

Typically, the circular spline 11 which is the external gear is fixed, the input shaft is coupled to the wave generator 13, and the output shaft is coupled to the flex spline 12. When the input shaft is rotated, the elliptic cam of the wave generator 13 is also rotated and a mesh position between the flex spline 12 and the circular spline 11 is also rotated. FIGS. 2A to 2D are diagrams showing a case in which the circular spline 11 is fixed and the wave generator 13 makes one turn. As stated above, the number of teeth of the flex spline 12 is smaller than the number of teeth of the circular spline 11 by two. Accordingly, when the input shaft (wave generator 13) makes one turn, the flex spline 12 rotates in the opposite direction by the amount corresponding to the difference in the number of teeth, i.e., two teeth (δdeg). In this way, an extremely large reduction ratio is achieved by the harmonic drive gear 10.

Figure 3:
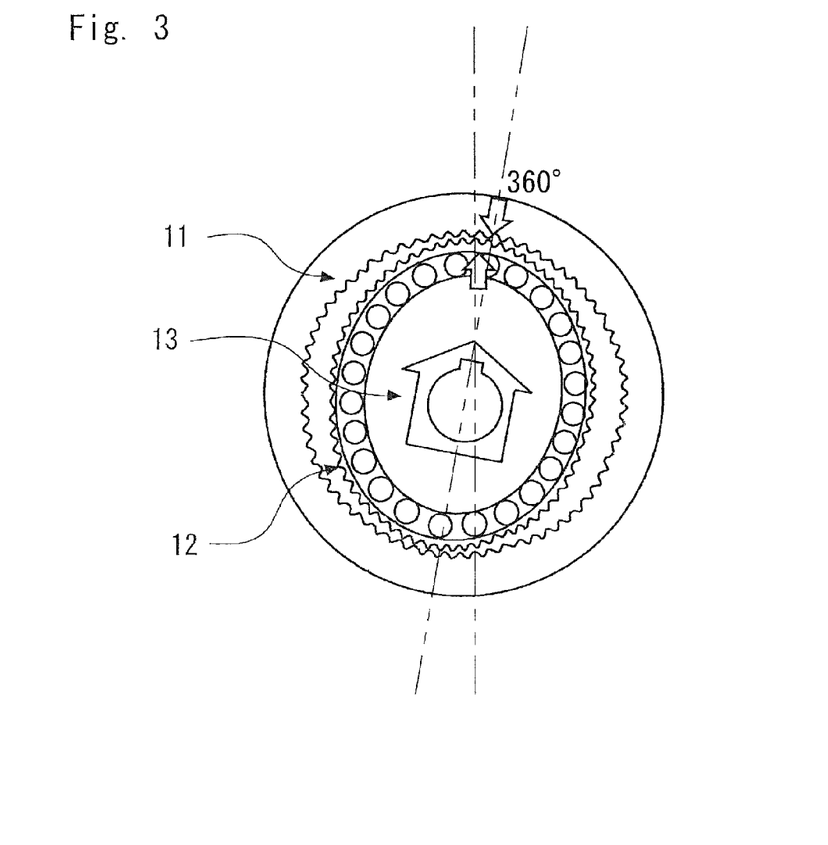
FIG. 3 is a diagram showing a state in which stop of a flex spline is achieved by rotary-driving each of a wave generator and a circular spline by a predetermined angle.

In the description above, the wave generator 13 is rotated in a state in which the circular spline 11 is fixed. Now, consider a case in which the circular spline 11 is also rotated while being coupled to drive means (motor) without fixing the circular spline 11. For example, assume a case in which the circular spline 11 is rotated by δdeg while the wave generator 13 is rotated by 360+δdeg in the same direction. Then, as shown in FIG. 3, it results in that the flex spline 12 does not rotate at all from the initial position. In summary, by rotating the internal gear (wave generator 13) and the external gear (circular spline 11) with some speed difference, it is possible to create a state in which the intermediate gear (flex spline 12) does not rotate at all.

In the similar way, by rotating the internal gear (wave generator 13) and the intermediate gear (flex spline 12) with some speed difference, it is also possible to create a state in which the external gear (circular spline 11) does not rotate at all. In summary, it is possible to carry out such a control as to stop the output shaft while all the three elements relatively move with the speed difference (not in the static friction state).

Figure 4:
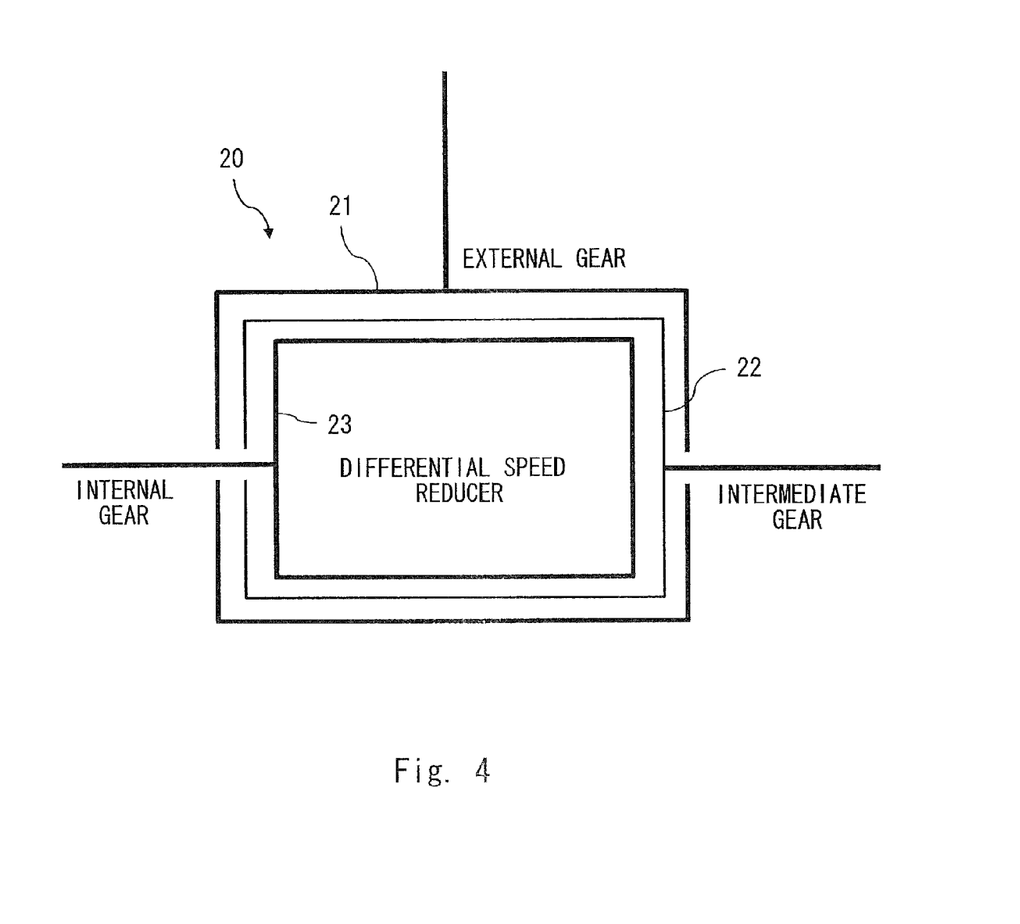
FIG. 4 is a diagram schematically describing a differential speed reducer.

For the purpose of the following description, the differential speed reducer is schematically expressed as shown in FIG. 4. Specifically, the differential speed reducer 20 is expressed by triple boxes: the outermost box is an external gear 21, the innermost box is an internal gear 23, and the box between the two boxes is an intermediate gear 22.

When the differential speed reducer is a harmonic drive gear, the external gear 21 corresponds to the circular spline 11, the intermediate gear 22 corresponds to the flex spline 12, and the internal gear 23 corresponds to the wave generator 13.

(Related Robot Joint)

A joint structure of a robot includes a motor and a differential speed reducer arranged between a first link and a second link, and relatively rotates the second link with respect to the first link by a drive force of the motor.

Figure 5:
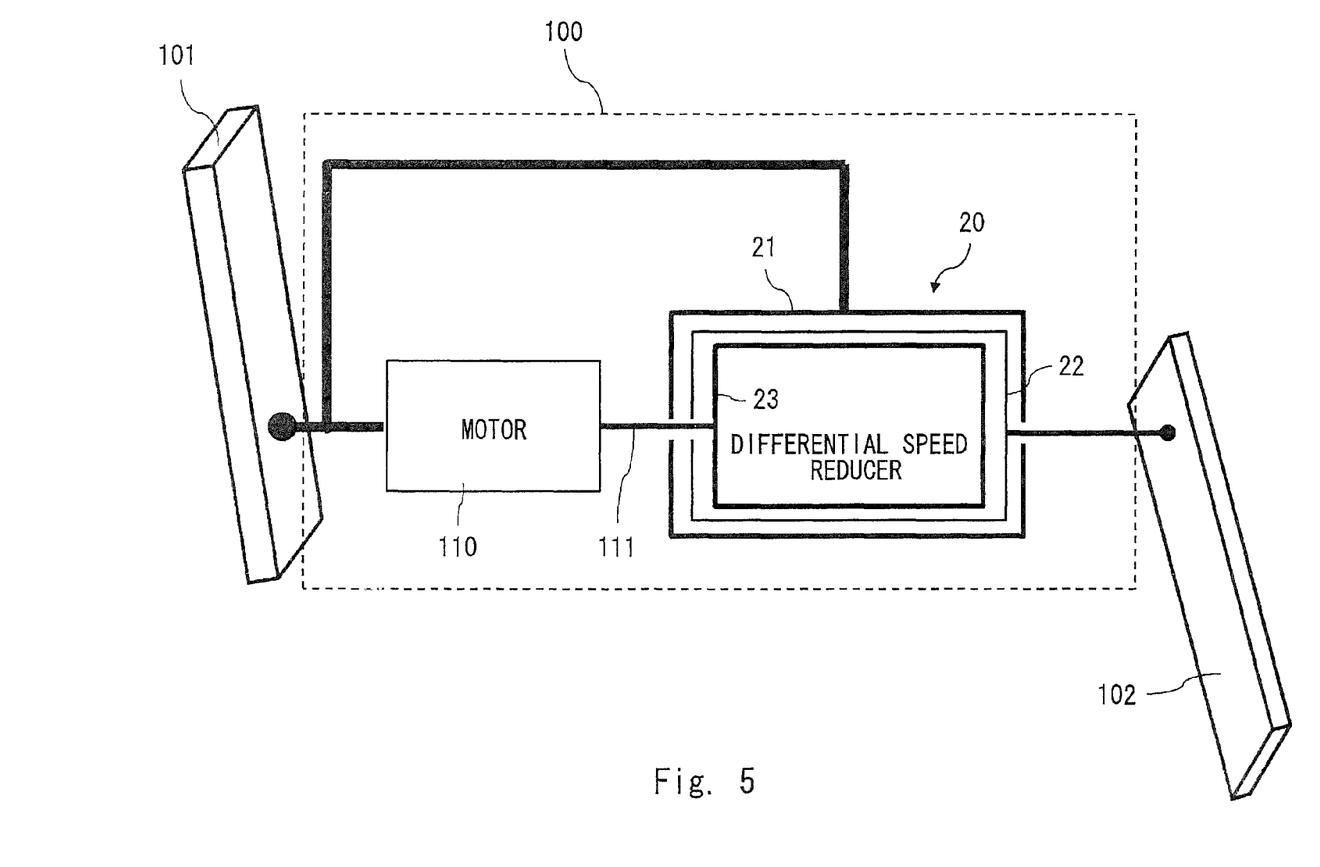
FIG. 5 is a diagram showing a related robot joint unit as a comparative example.

FIG. 5 shows a related robot joint unit 100 as a comparative example.

A motor 110 is fixed to a first link 101, and an output shaft 111 of the motor 110 is coupled to an internal gear (wave generator) 23. Further, an external gear (circular spline) 21 is fixed to the first link 101. An intermediate gear (flex spline) 22 is coupled to a second link 102.

When a current is applied to the motor 110 from a predetermined motor drive circuit (not shown) in this state, the motor 110 rotationally drives. Since the drive of the motor rotates the motor output shaft 111, the internal gear (wave generator) 22 rotates integrally with the output shaft 111. When the internal gear (wave generator) 22 rotates, the rotational speed of the intermediate gear (flex spline) 22 is reduced by the mesh of the external gear (circular spline) 21 with the intermediate gear (flex spline) 22. The rotation of the intermediate gear (flex spline) 22 is transmitted to the second link 102 as an output, thereby driving the second link 102.

In the related robot joint structure 100, in order to keep the second link 102 stationary with respect to the first link 101, it is naturally required to stop the drive of the motor. Accordingly, when the second link 102 stops, large static friction acts among the three elements (internal gear 23, intermediate gear 22, and external gear 21) of the differential speed reducer. In this case, even when a force is applied from the side of the second link in the stationary state, the second link 102 cannot move due to large friction resistance in the differential speed reducer. For example, the joint unit 100 does not move even if a person touches the second link 102, and thus it is impossible to mitigate the power at the time of contact.

According to the present invention, two motors are used to continuously rotate two of the three elements of the differential speed reducer 20 with a predetermined speed difference.

Accordingly, such a state can be achieved in which the static friction does not act even when the output shaft keeps the stationary state.

First Exemplary Embodiment

An exemplary embodiment according to the present invention may include the patterns described as follows.

(First Pattern)

Figure 6:
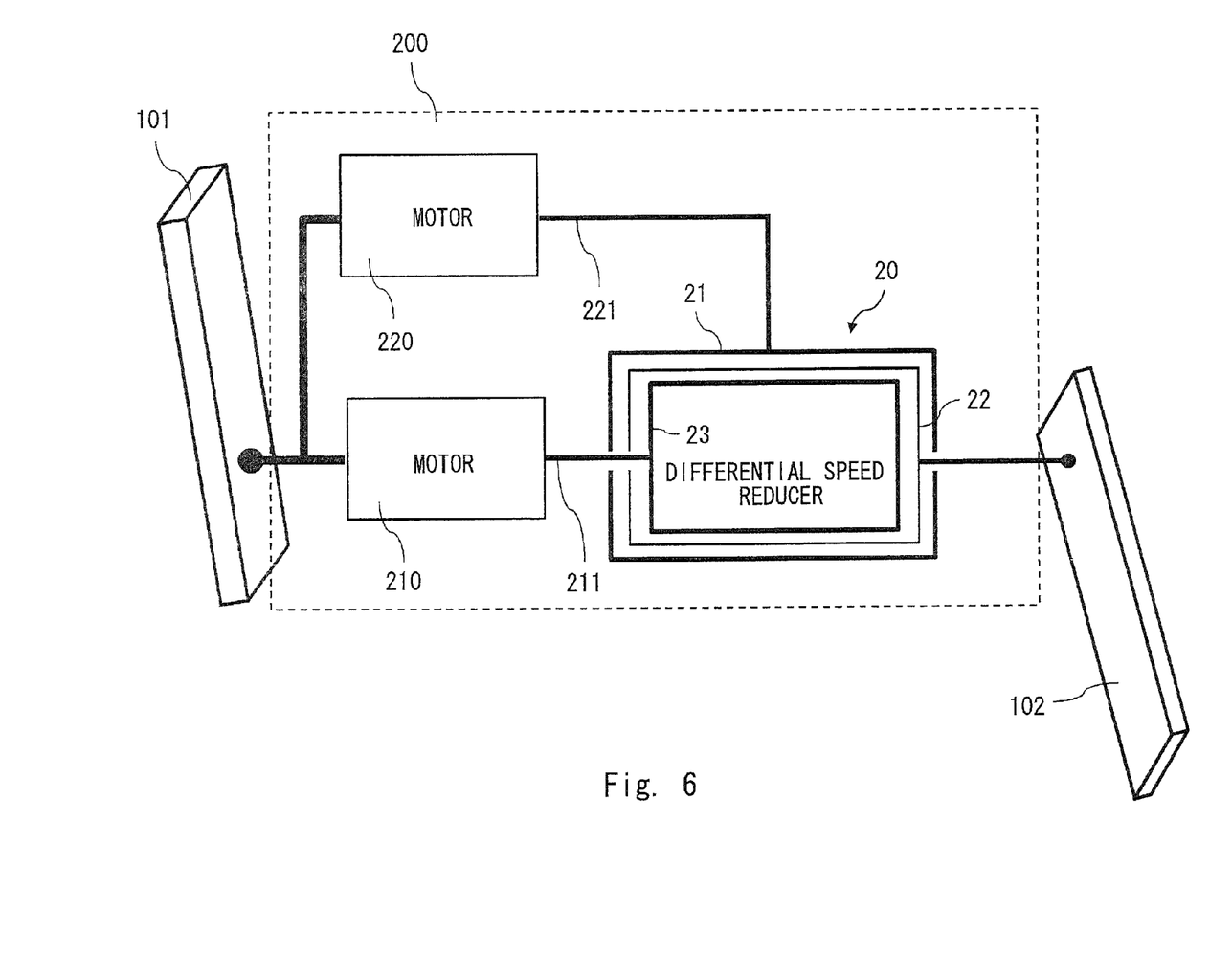
FIG. 6 is a diagram showing a first pattern.

FIG. 6 shows a first pattern.

In the first pattern, two motors of a first motor 210 and a second motor 220 are included. The first motor 210 is fixed to a first link 101, and an output shaft 211 of the first motor 210 is coupled to an internal gear (wave generator) 23 of a differential speed reducer 20. While the second motor 220 is also fixed to the first link 101, an output shaft 221 of the second motor 220 is coupled to an external gear (circular spline) 21 of the differential speed reducer 20. A second link 102 is coupled to an intermediate gear (flex spline) 22 of the differential speed reducer 20.

In such a configuration, the internal gear (wave generator) 23 and the external gear (circular spline) 21 are rotated in the same direction with a predetermined speed difference, thereby capable of stopping the intermediate gear (flex spline) 22. Accordingly, such a state can be achieved in which the static friction does not act on the differential speed reducer 20 even when the first link 101 and the second link 102 mutually keep the stationary state.

An example in which the differential speed reducer 20 is a harmonic drive gear 10 will be described in detail.

The number of teeth of the circular spline (external gear) 11 is denoted by Zc, and the number of teeth of the flex spline (intermediate gear) 12 is denoted by Zf. Further, the rotational speed of the wave generator (internal gear) 13 is denoted by Vw, the rotational speed of the flex spline (intermediate gear) 12 is denoted by Vf, and the rotational speed of the circular spline (external gear) 11 is denoted by Vc.

At this time, it is required that the following formula is satisfied in order to make the rotational speed of the flex spline (intermediate gear) 12 zero.

When $V_f = 0$, $$V_w : V_c = 1 : \frac{Z_c - Z_f}{Z_c}$$

For example, when the number of teeth of the flex spline (intermediate gear) 12 is 200 and the number of teeth of the circular spline (external gear) 11 is 202, the above formula may be expressed as follows.

$$V_w : V_c = 1 : \frac{Z_c - Z_f}{Z_c}$$
$$= 1 : \frac{202 - 200}{202} = 1 : \frac{2}{202}$$
$$= 202 : 2$$

In other words, when the circular spline (external gear) 11 is rotated by the amount corresponding to two teeth while the wave generator (internal gear) 13 makes turn "by 360°+the amount corresponding to two teeth" in the same direction, then the flex spline (intermediate gear) 12 does not rotate. Further, in other words, when the circular spline 11 is rotated at 0.2 rpm while rotating the wave generator at 20.2 rpm in the same direction, then the flex spline 12 does not rotate but stops.

It is desirable to minimize the friction in the differential speed reducer in a state in which the joint is stopped. It is only required to rotate the wave generator (internal gear) 13 and the circular spline (external gear) 11 so as to generate a speed difference to minimize the friction with a rotational speed ratio which can achieve joint stop.

Figure 7:
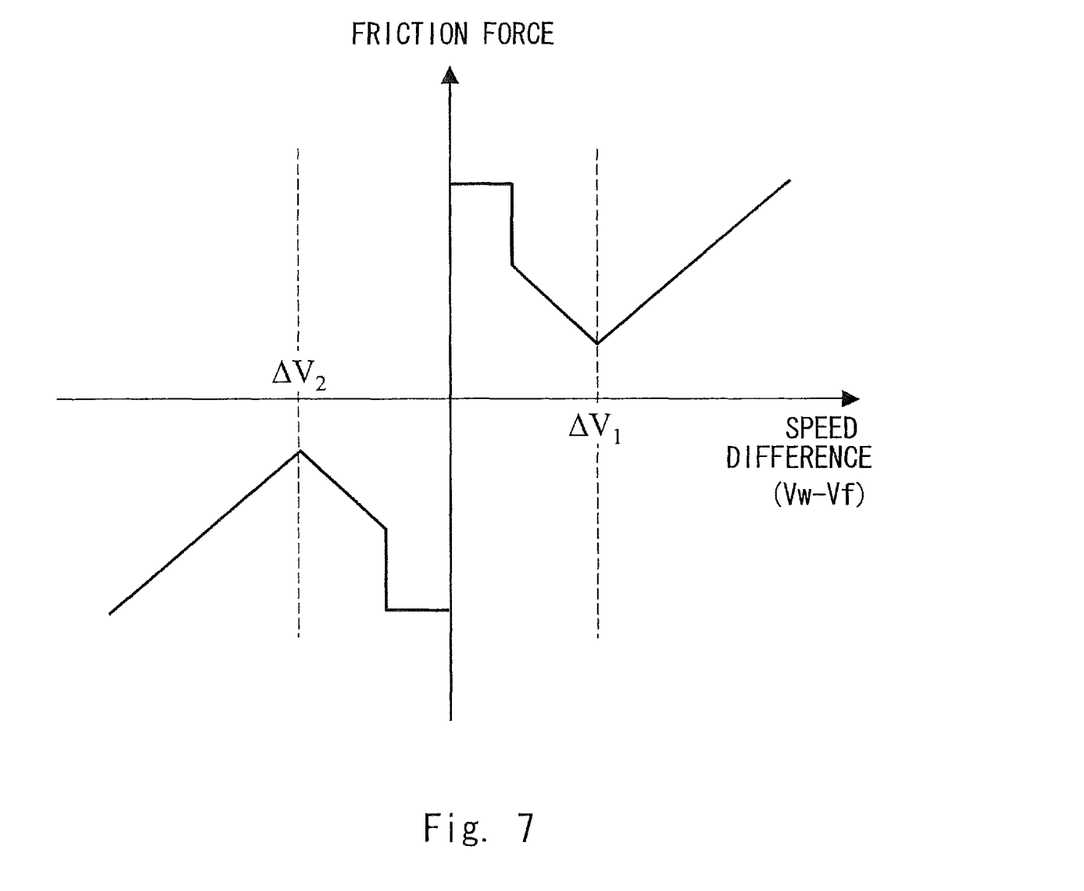
FIG. 7 is a diagram showing an example of a friction model.

For example, when the friction model is obtained as shown in FIG. 7, a rotational speed that can keep the joint stationary state is obtained with a point around the speed differences $\Delta V_1$ and $\Delta V_2$ where the smallest friction is obtained.

The term "speed difference" here means a rotational speed difference between the wave generator (internal gear) 13 and the flex spline (intermediate gear) 12.

A command current may be applied to each of the first motor 210 and the second motor 220 in order to achieve the rotational speed that is required.

When it is desired to relatively drive the second link 102 with respect to the first link 101 for joint motion, according to the simplest method, it is only required to stop the second motor 220 and to drive only the first motor 210. In short, it is only required to fix the external gear (circular spline) 21 and to rotate the internal gear (wave generator) 23.

This provides the joint motion that is the same to that of the related art.

Alternatively, since the rotation of the intermediate gear (flex spline) 22 is generated by a relative rotation between the internal gear (wave generator) 23 and the external gear (circular spline) 21, the internal gear (wave generator) 23 and the external gear (circular spline) 21 may be rotated in opposite directions. Compared to a case in which the external gear (circular spline) 21 is simply fixed, the rotative power of the intermediate gear (flex spline) 22 can be shared between the first motor 210 and the second motor 220, whereby the load of the first motor 210 can be mitigated.

Even in such a state in which the joint is stopped, it is possible to secure high back drivability since the friction in the differential speed reducer becomes small.

For example, even when a person touches the robot, the force applied to the second link 102 may easily be transmitted to the input shaft from the output shaft of the differential speed reducer 20.

Accordingly, even when a person touches the robot, the joint of the robot easily bends due to its force, whereby the force at the time of contact can be mitigated. In short, it is possible to achieve so-called soft joints.

Furthermore, such an advantage can be achieved in which no large power is required even when a person teaches the robot by moving hands and feet of the robot.

(Second Pattern)

Figure 8:
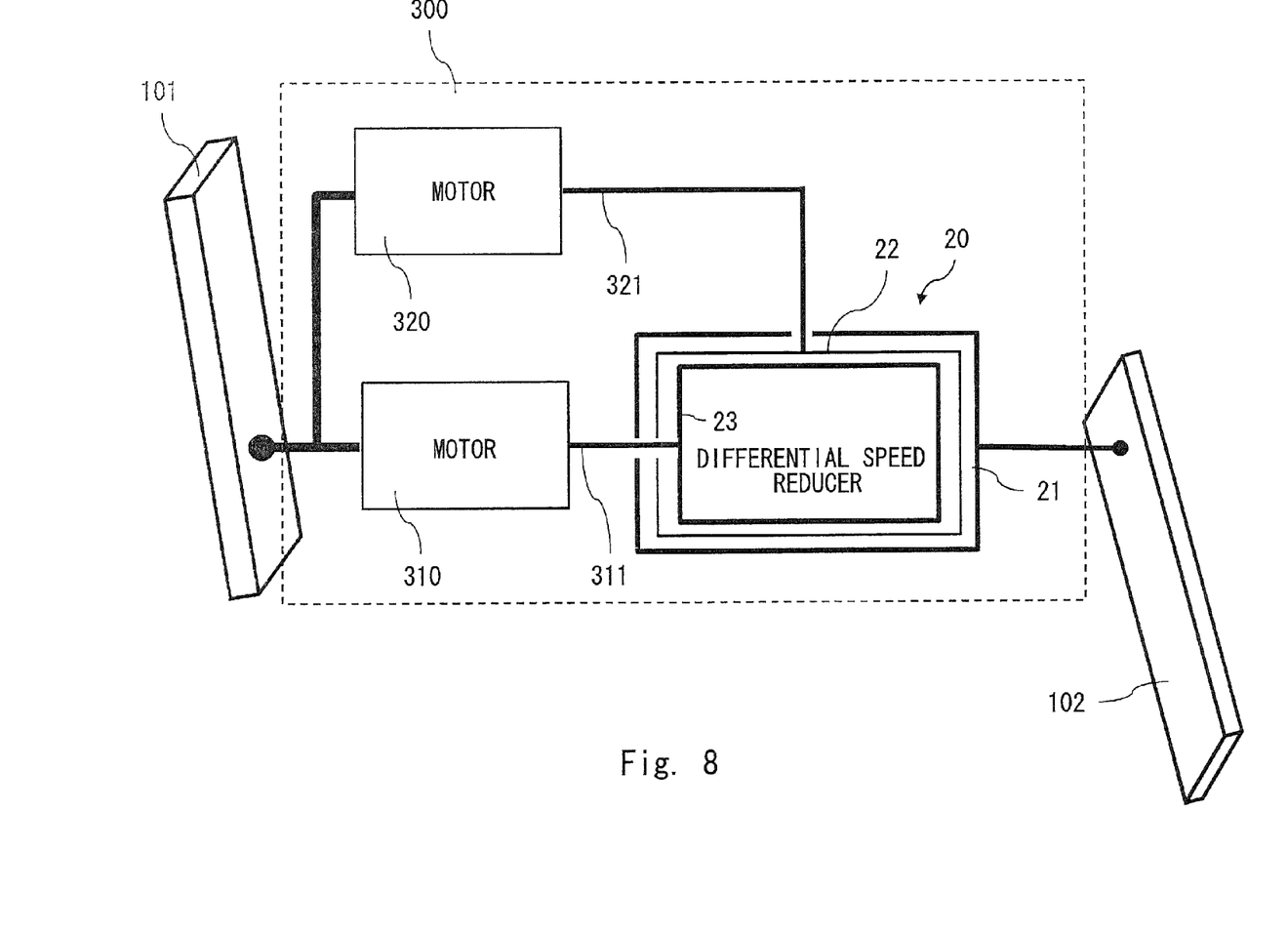
FIG. 8 is a diagram showing a second pattern.

FIG. 8 shows a second pattern.

In the second pattern, a first motor 310 is fixed to the first link 101, and an output shaft 311 of the first motor 310 is coupled to the internal gear (wave generator) 23 of the differential speed reducer 20. Although a second motor 320 is also fixed to the first link 101, an output shaft 321 of the second motor 320 is coupled to the intermediate gear (flex spline) 22 of the differential speed reducer 20. The second link is coupled to the external gear of the differential speed reducer.

In such a structure, by rotating the internal gear (wave generator) 23 and the intermediate gear (flex spline) 22 in opposite directions at a predetermined relative speed, it is possible to stop the external gear (circular spline) 21. Accordingly, such a state can be achieved in which the static friction does not act on the differential speed reducer even when the first link 101 and the second link 102 mutually keep the stationary state.

In the structure of the second pattern, it is required to satisfy the following formula in order to make the rotational speed of the external gear (circular spline) 21 zero.

When $V_c=0$, $$V_w:V_f = 1:\frac{Z_f - Z_c}{Z_f}$$

When the differential speed reducer 20 is the harmonic drive gear 10, the number of teeth $Z_f$ of the flex spline 12 is 200, and the number of teeth $Z_c$ of the circular spline 11 is 202, the above formula can be expressed as follows.

$$\begin{aligned} V_w:V_f &= 1:\frac{Z_f - Z_c}{Z_f} \\ &= 1:\frac{200 - 202}{200} \\ &= 1:\frac{-2}{200} \\ &= 200:-2 \end{aligned}$$

In short, when the flex spline (intermediate gear) 12 is rotated in the opposite direction by the amount corresponding to two teeth while the wave generator (internal gear) 13 makes one turn, it results in that the circular spline (external gear) 11 does not rotate.

Further, in other words, when the flex spline (intermediate gear) 12 is rotated at 0.2 rpm in the opposite direction while rotating the wave generator (internal gear) 13 at 20 rpm, the circular spline (external gear) 11 does not rotate but stops.

As mentioned above, the rotational speed of each of the wave generator (internal gear) 13 and the rotational speed of the flex spline (intermediate gear) 12 are obtained based on the friction model in order to minimize the friction in the differential speed reducer in the state in which the joint is stopped.

It is only required to apply a command current to each of the first motor 310 and the second motor 320 in order to achieve the rotational speed that is required.

When it is desired to relatively drive the second link 102 with respect to the first link 101 for joint motion, according to the simplest method, it is only required to stop the second motor 320 and to drive only the first motor 310. In summary, it is only required to fix the intermediate gear (flex spline) 22 and to rotate the internal gear (wave generator) 23.

Accordingly, the external gear (circular spline) 21 rotates, whereby the second link 102 drives to perform the joint motion.

Alternatively, the internal gear (wave generator) 23 and the intermediate gear (flex spline) 22 may be rotated in the same direction.

Compared to the case in which the intermediate gear (flex spline) 22 is simply fixed, the load of the first motor 310 can be mitigated since the rotative power of the external gear (circular spline) 21 can be shared between the first motor 310 and the second motor 320.

Second Exemplary Embodiment

While a case in which the differential speed reducer is the harmonic drive gear (harmonic drive (registered trademark)) has been described above in the first exemplary embodiment, it is needless to say that other devices may be used as the differential speed reducer.

A case in which a planetary gear drive is used as the differential speed reducer will be exemplified.

Figure 9:
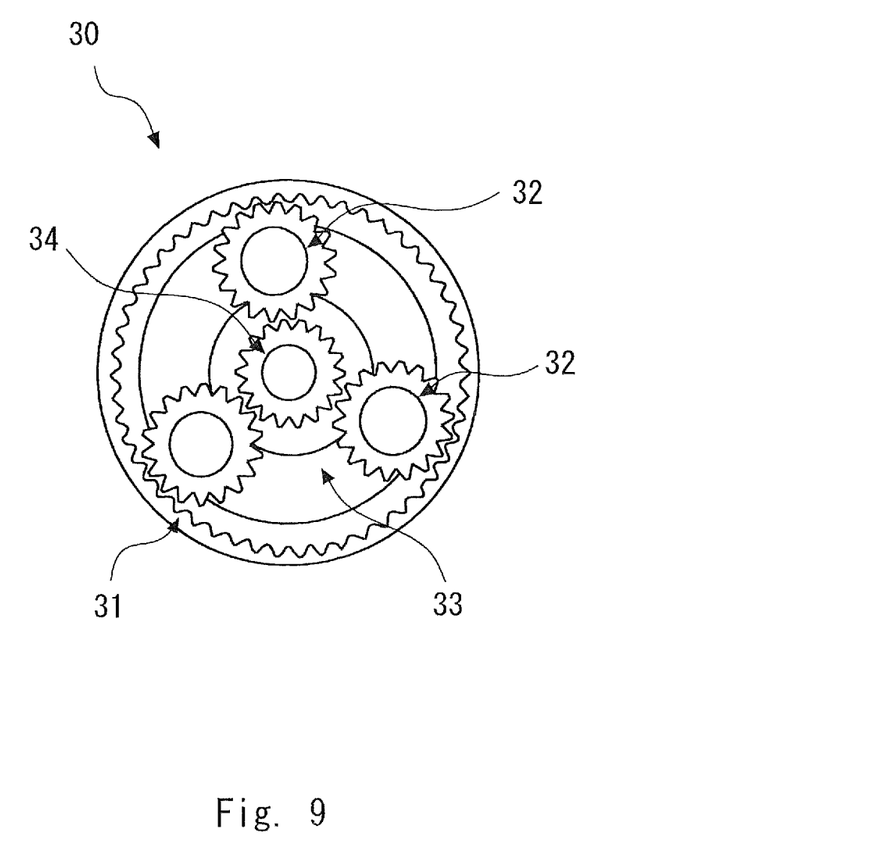
FIG. 9 is a diagram showing a configuration of a planetary gear drive.

A planetary gear drive 30 includes, as shown in FIG. 9, an outer gear 31, a plurality of planetary gears 32, a planetary carrier 33 that receives revolution of the planetary gears 32, and a sun gear 34.

The planetary gears 32 mesh with the sun gear 34 and the outer gear 31, and perform rotation and revolution.

The outer gear 31 corresponds to the external gear 21, the planetary gears 32 and the planetary carrier 33 correspond to the intermediate gear 22, and the sun gear 34 corresponds to the internal gear 23.

The above first pattern and the second pattern may be applied also to the planetary gear drive 30.

(Second Pattern in Planetary Gear)

The above first pattern and the second pattern may be applied also to the planetary gear mechanism. Now, a case in which the planetary gear drive 30 is applied to the second pattern will be described. Specifically, the first motor 310 is fixed to the first link 101, and at the same time the output shaft 311 of the first motor 310 is coupled to the internal gear (sun gear) 23 of the differential speed reducer 20.

The second motor 320 is fixed to the first link 101, and the output shaft 321 of the second motor 320 is coupled to the intermediate gear (planetary gear, planetary carrier) 22 of the differential speed reducer 20. The second link 102 is coupled to the external gear (outer gear) 21 of the differential speed reducer 20.

In such a configuration, it is possible to stop the external gear (outer gear) 21 by rotating the internal gear (sun gear) 23 and the intermediate gear (planetary gear, planetary carrier) 22 in the same direction at a predetermined relative speed.

Accordingly, such a state can be achieved in which the static friction does not act on the differential speed reducer 20 even when the first link 101 and the second link 102 mutually keep the stationary state.

The number of teeth of the sun gear 34 is Zs, the number of teeth of the planetary gear 32 is Zp, and the number of teeth of the outer gear 31 is Zo.

Further, the rotational speed of the sun gear 34 is denoted by Vs, the rotational speed (revolution speed of the planetary gear) of the planetary carrier 33 is denoted by Vp, and the rotational speed of the outer gear 31 is denoted by Vo.

At this time, it is required to satisfy the following formula in order to make the rotational speed Vo of the outer gear 31 zero.

When $v_o=0$, $$V_E : V_p = 1 : \frac{Z_s}{Z_s + Z_o}$$

When the number of teeth Zs of the sun gear 34 is 40, and the number of teeth Zo of the outer gear 31 is 80, the above formula is expressed as follows. (For example, the number of teeth of the planetary gear is set to 20.)

$$V_s : V_p = 1 : \frac{Z_s}{Z_s + Z_o}$$
$$= 1 : \frac{40}{40 + 00}$$
$$= 1 : \frac{1}{3}$$
$$= 3 : 1$$

In summary, when the planetary gear 32 is revolved once (when the planetary carrier 33 makes one turn) while the sun gear 34 makes three turns, it results in that the outer gear 31 does not rotate. Further, in other words, when the planetary gear 32 is rotated (revolved) at 1 rpm while rotating the sun gear 34 at 3 rpm in the same direction, the outer gear 31 does not rotate but stops.

In this way, it is possible to reduce the friction in the differential speed reducer (planetary gear mechanism) while stopping the joint motion.

(Third Pattern)

A third pattern will be described next.

Figure 10:
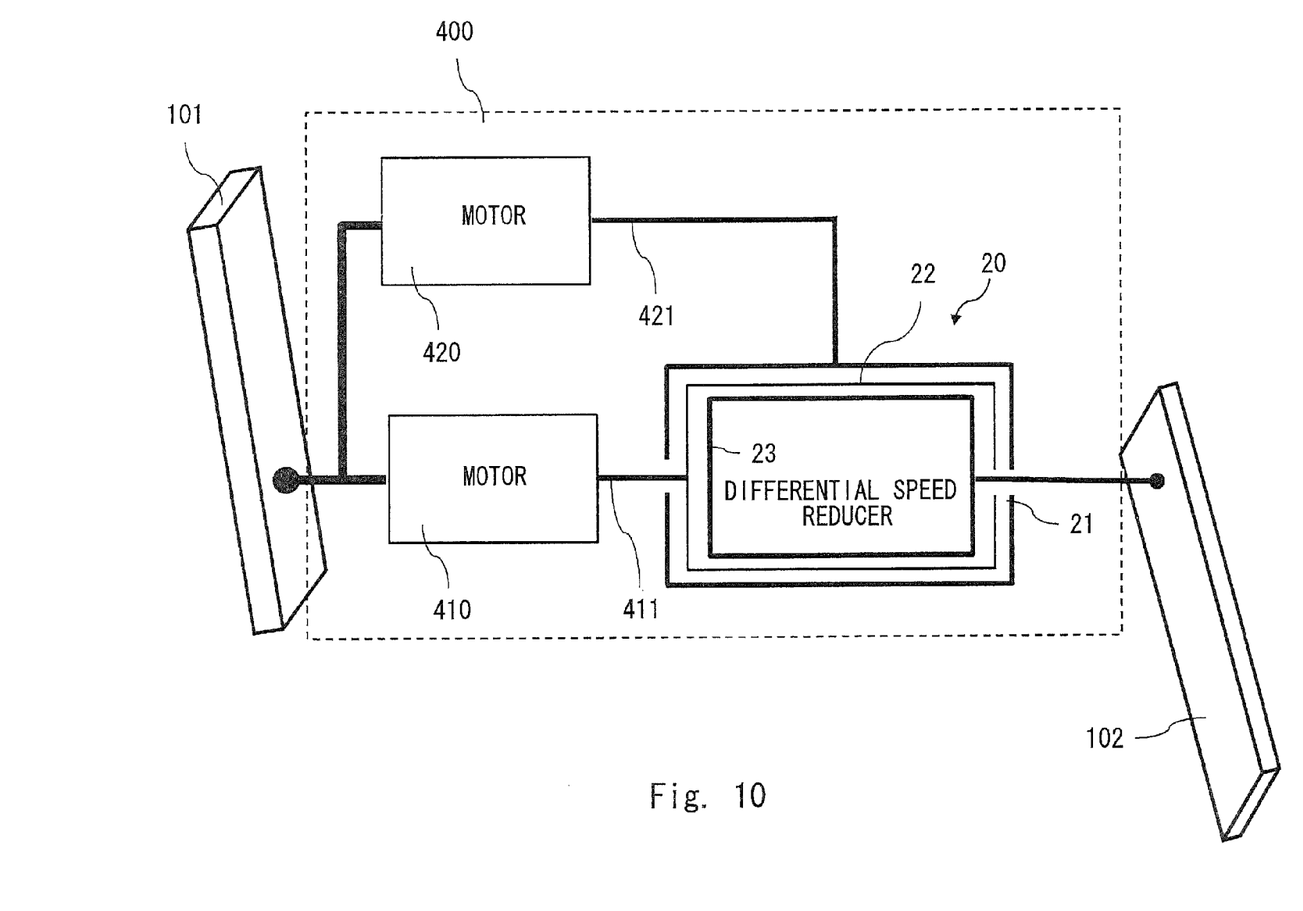
FIG. 10 is a diagram showing a third pattern.

FIG. 10 shows the third pattern.

In the third pattern, a first motor 410 is fixed to the first link 101, and an output shaft 411 of the first motor 410 is coupled to the intermediate gear (planetary gear, planetary carrier) 22 of the differential speed reducer 20.

While a second motor 420 is also fixed to the first link 101, an output shaft 421 of the second motor 420 is coupled to the external gear (outer gear) 21 of the differential speed reducer 20. The second link 102 is coupled to the internal gear (sun gear) 23 of the differential speed reducer 20.

In such a configuration, by rotating the intermediate gear (planetary gear, planetary carrier) 22 and the external gear (outer gear) 21 at a predetermined relative speed in the same direction, the internal gear (sun gear) 23 can be stopped. Accordingly, such a state can be achieved in which the static friction does not act on the differential speed reducer 20 even when the first link 101 and the second link 102 mutually keep the stationary state.

In the structure of the third pattern, it is required to satisfy the following formula in order to make the rotational speed of the internal gear (sun gear) 23 zero.

When $v_s=0$, $$V_o : V_p = 1 : \frac{Z_o}{Z_s + Z_o}$$

When the number of teeth of the sun gear (internal gear) 34 is 40, and the number of teeth of the outer gear (external gear) 31 is 80, the above formula is expressed as follows. (For example, the number of teeth of the planetary gear is set to 20.)

$$V_o : V_p = 1 : \frac{Z_o}{Z_s + Z_o}$$
$$= 1 : \frac{80}{40 + 80}$$
$$= 1 : \frac{2}{3}$$
$$= 3 : 2$$

In summary, when the planetary gear (intermediate gear) 32 is revolved twice (when the planetary carrier 33 makes two turns) while the outer gear (external gear) 31 makes three turns in the same direction, it results in that the sun gear (internal gear) 34 does not rotate.

Further, in other words, when the planetary gear 32 is rotated (revolved) at 2 rpm while rotating the outer gear 31 at 3 rpm in the same direction, the sun gear 34 does not rotate but stops.

In this way, it is possible to reduce the friction in the differential speed reducer (planetary gear mechanism) while stopping the joint motion.

Note that the present invention is not limited to the exemplary embodiments stated above, but may be changed as appropriate without departing from the spirit of the present invention.

While the harmonic drive gear and the planetary gear drive have been exemplified as the differential speed reducer, other devices may be applied as the differential speed reducer.

Needless to say, all of the first pattern, the second pattern, and the third pattern may be applied to the harmonic drive gear, and further all the first pattern, the second pattern, and the third pattern may be applied to the planetary gear drive.

REFERENCE SIGNS LIST

10 HARMONIC DRIVE GEAR
11 CIRCULAR SPLINE
12 FLEX SPLINE
13 WAVE GENERATOR
20 DIFFERENTIAL SPEED REDUCER
21 EXTERNAL GEAR
22 INTERMEDIATE GEAR
23 INTERNAL GEAR
30 PLANETARY GEAR DRIVE
31 OUTER GEAR
32 PLANETARY GEAR
33 PLANETARY CARRIER
34 SUN GEAR
100 ROBOT JOINT UNIT
101 FIRST LINK
102 SECOND LINK
110 MOTOR
111 OUTPUT SHAFT
200 ROBOT JOINT UNIT
210 FIRST MOTOR
211 OUTPUT SHAFT
220 SECOND MOTOR
221 OUTPUT SHAFT
310 FIRST MOTOR
311 OUTPUT SHAFT
320 SECOND MOTOR
321 OUTPUT SHAFT
410 FIRST MOTOR
411 OUTPUT SHAFT
420 SECOND MOTOR
421 OUTPUT SHAFT

The invention claimed is:

1. A method of driving a joint device comprising a drive unit and a differential speed reducer provided between a first link and a second link, the joint device controlling drive of the first link and the second link as joints, wherein
the differential speed reducer comprises an internal gear, an intermediate gear, and an external gear, and
the drive unit comprises a first motor and a second motor, the method comprising:
fixedly connecting the first motor and the second motor to the first link;
coupling an output shaft of the first motor to one of the internal gear, the intermediate gear, and the external gear of the differential speed reducer;
coupling an output shaft of the second motor to one of the internal gear, the intermediate gear, and the external gear of the differential speed reducer which is different from the gear coupled to the output shaft of the first motor; and
coupling to the second link one of gears of the internal gear, the intermediate gear, and the external gear of the differential speed reducer which is different from the gear coupled to the output shaft of the first motor and the gear coupled to the output shaft of the second motor; and
rotating both of the first motor and the second motor at a rotational speed larger than zero, and stopping the second link by differentiating the rotational speed of the first motor and that of the second motor when the first link and the second link are relatively stopped to keep a joint angle fixed.

2. The method of driving the joint device according to claim 1, wherein the differential speed reducer is a harmonic drive gear mechanism or a planetary gear mechanism.

3. The method of driving the joint device according to claim 1, comprising:
specifying a relation between a friction force and a relative speed difference among the internal gear, the intermediate gear, and the external gear as a friction model in the differential speed reducer, and
determining a rotational speed in each of the first motor and the second motor so as to approach a speed difference to minimize the friction with a rotational speed ratio which can achieve joint stop.

* * * * *